Figure 1:
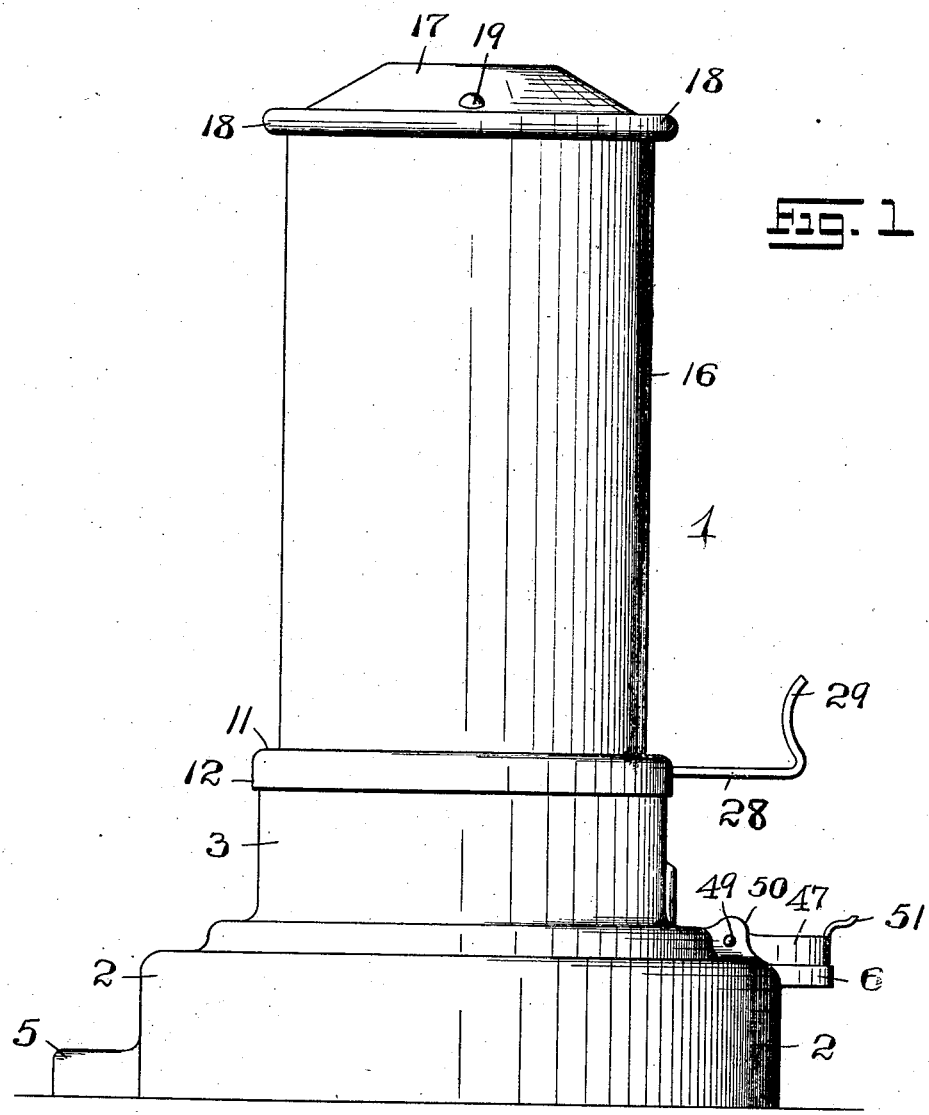

No. 894,363. PATENTED JULY 28, 1908.
F. E. BLODGETT & C. E. KAIL.
VENDING MACHINE.
APPLICATION FILED JULY 11, 1907.

6 SHEETS—SHEET 1.

WITNESSES:

INVENTORS:
Frederick E. Blodgett
Charles E. Kail,
BY Fraentzel and Richards,
ATTORNEYS

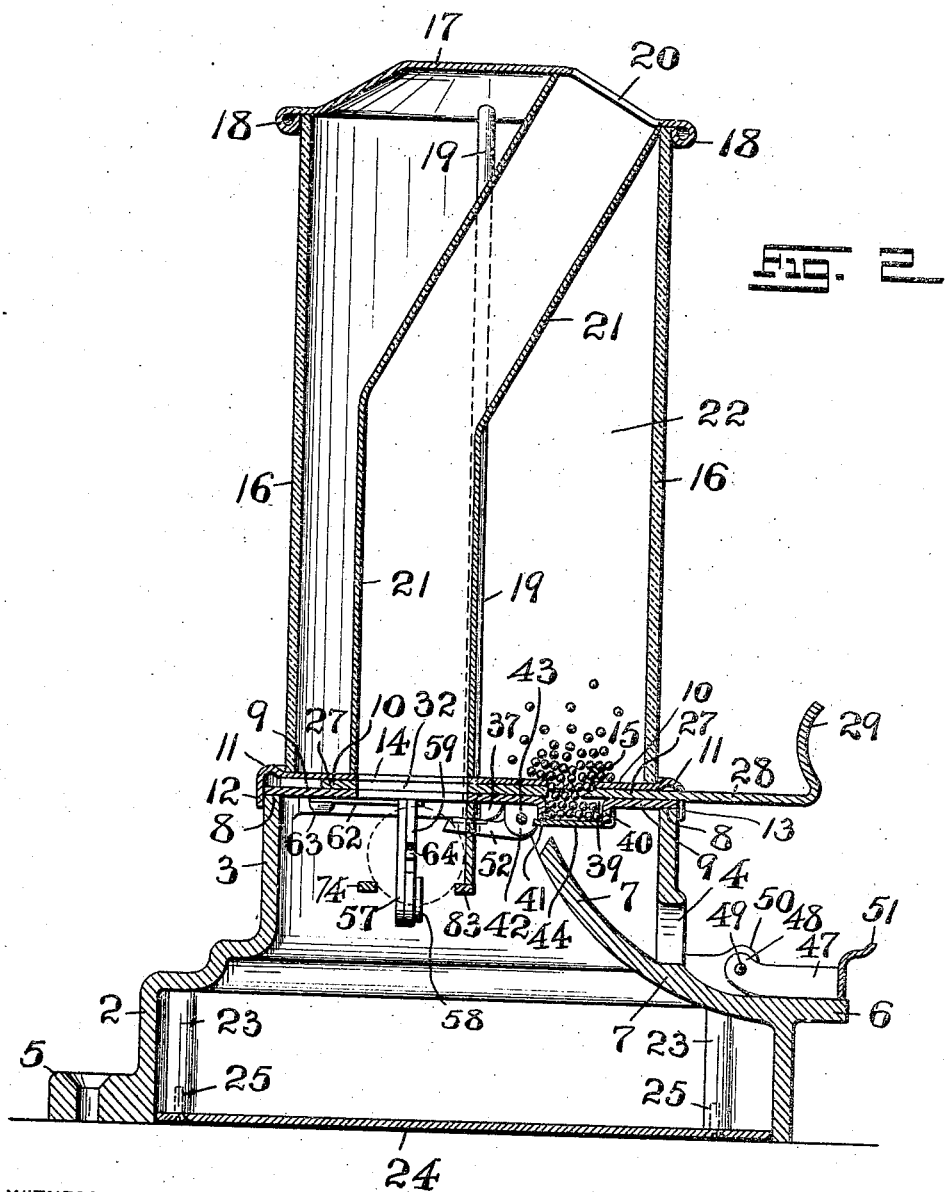

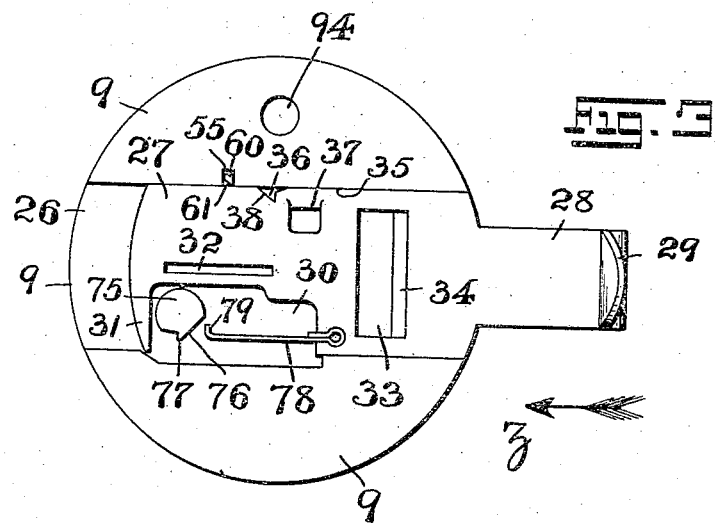
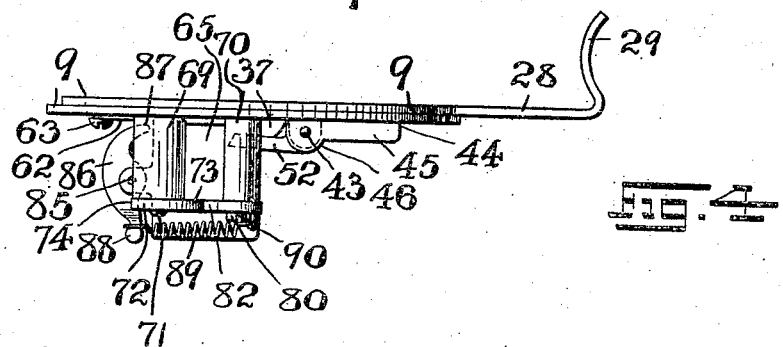
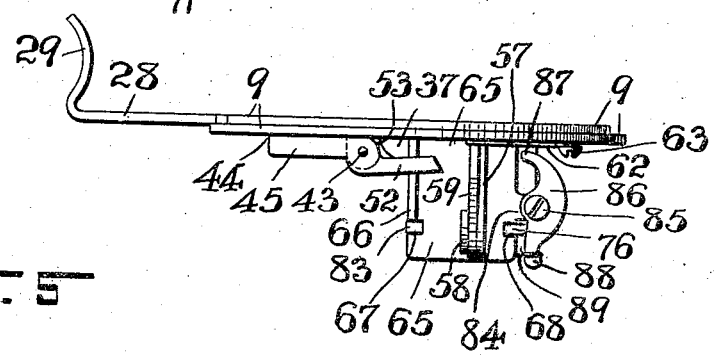

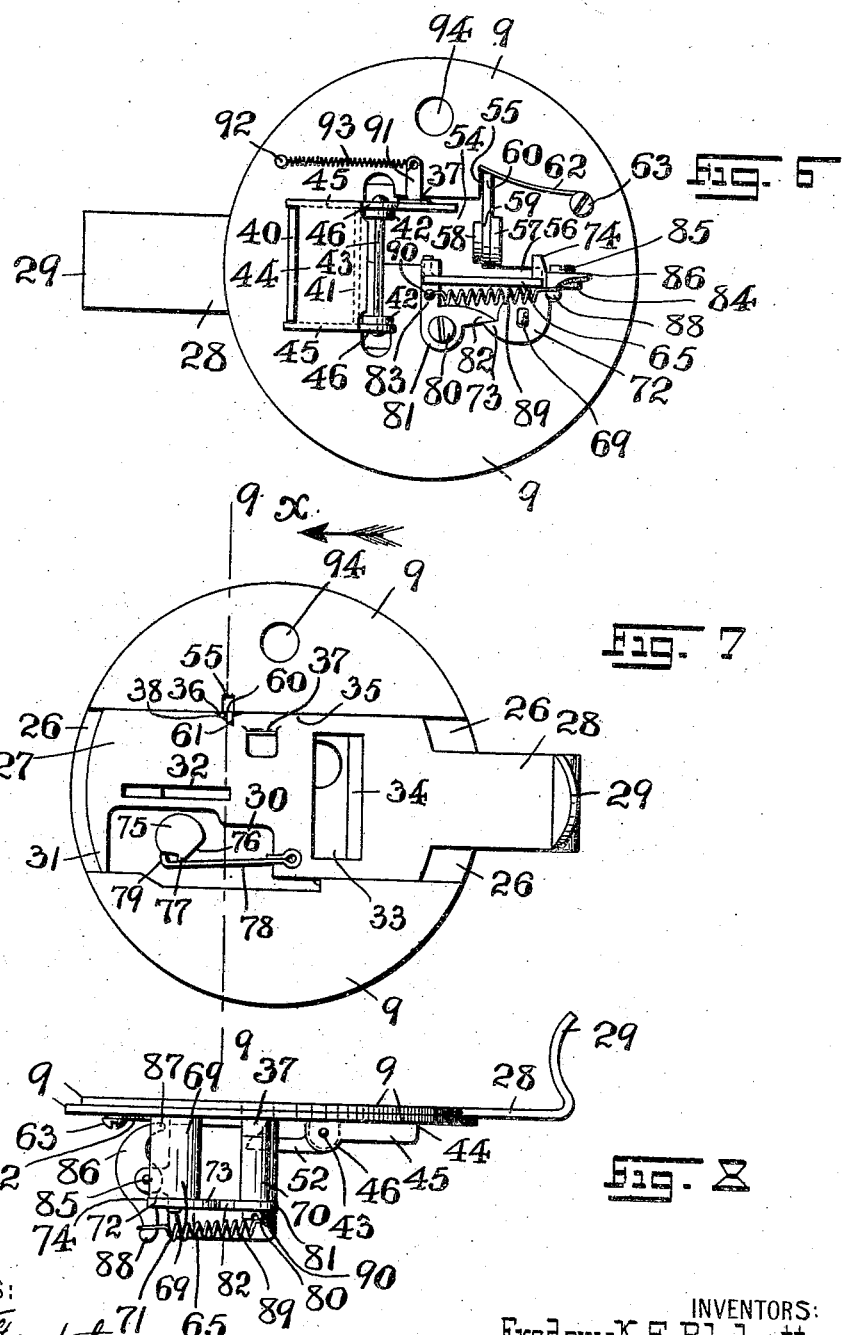

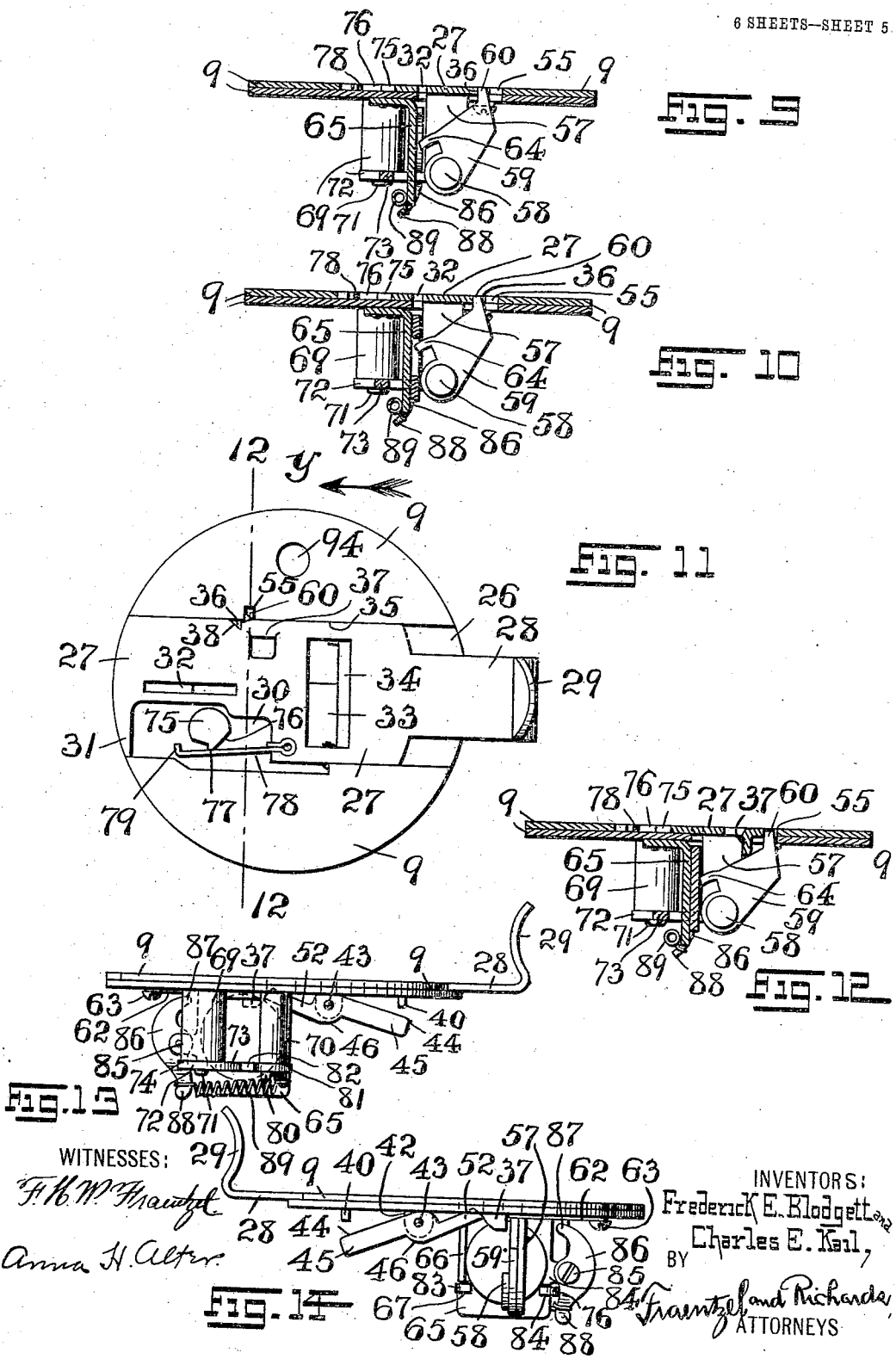

No. 894,363. PATENTED JULY 28, 1908.
F. E. BLODGETT & C. E. KAIL.
VENDING MACHINE.
APPLICATION FILED JULY 11, 1907.
6 SHEETS—SHEET 6.
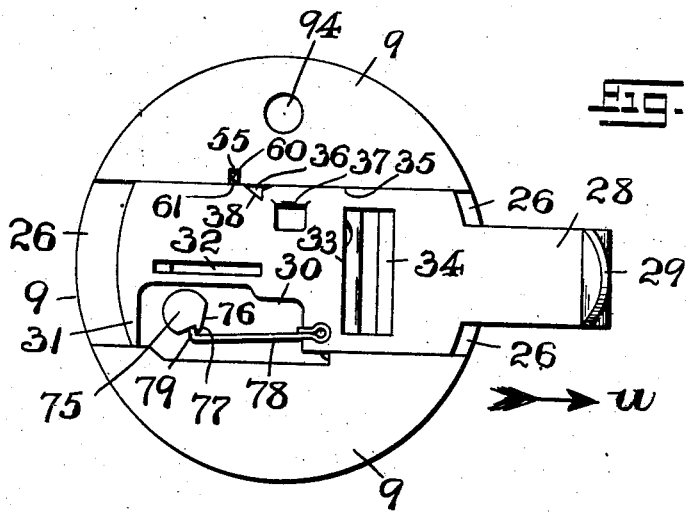
Fig. 15
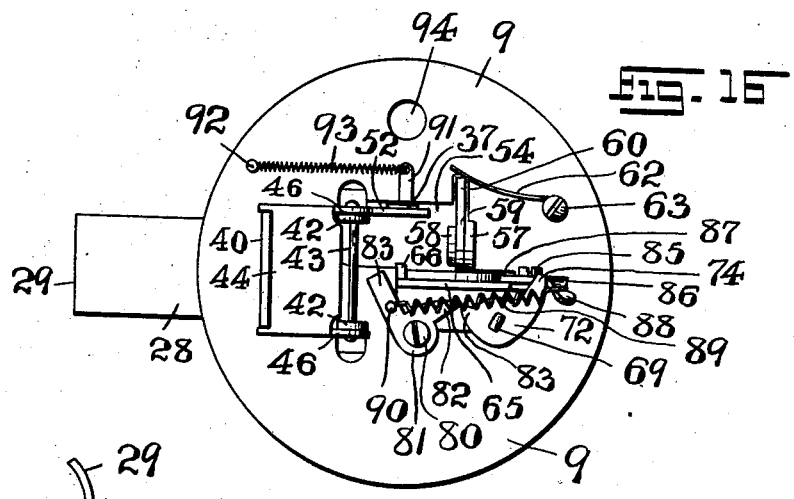
Fig. 16
Fig. 17
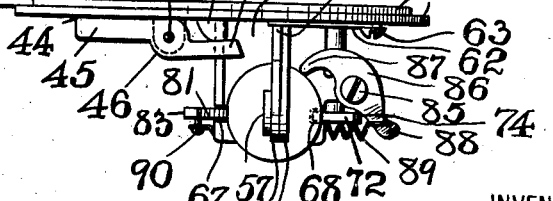
WITNESSES:
F. W. W. Fraentzel
Anna H. Alter
INVENTORS:
Frederick E. Blodgett and
Charles E. Kail,
BY Fraentzel and Richards
ATTORNEYS.

UNITED STATES PATENT OFFICE.

FREDERICK E. BLODGETT AND CHARLES E. KAIL, OF NEWARK, NEW JERSEY.

VENDING-MACHINE.

No. 894,363.   Specification of Letters Patent.   Patented July 28, 1908.

Application filed July 11, 1907. Serial No. 383,170.

*To all whom it may concern:*

Be it known that we, FREDERICK E. BLODGETT and CHARLES E. KAIL, citizens of the United States, residing at Newark, in the county of Essex and State of New Jersey, have invented certain new and useful Improvements in Vending-Machines; and we do hereby declare the following to be a full, clear, and exact description of the invention, such as will enable others skilled in the art to which it appertains to make and use the same, reference being had to the accompanying drawings, and to characters of reference marked thereon, which form a part of this specification This invention has reference, generally, to improvements in coin-operated vending machines; and the present invention relates, more particularly, to a novel coin-actuated and coin-controlled delivery-mechanism for use with that class of vending machines for dispensing small articles of manufacture, such as breath-pellets, small hard candies, or salted peanuts, but which may also be used with gum-selling and other vending machines.

Our present invention has for its principal object to provide a novel and simply constructed coin-actuated and coin controlled delivery-mechanism, the parts of which have been reduced to a minimum, and can not get out of order; and, furthermore, to provide a mechanism which is not operated by the usual slug that may be inserted in the coin-chute of the apparatus.

Other objects of the present invention not at this time more particularly enumerated will be clearly evident from the following detailed description of the same.

With the various objects of our present invention in view, the said invention consists, primarily, in the novel coin-actuated and coin-controlled delivery-mechanism for vending machines hereinafter set forth; and, furthermore, this invention consists in the novel arrangements and combinations of devices and parts, as well as in the details of the construction of the same, all of which will be hereinafter more particularly described, and then finally embodied in the clauses of the claims which are appended to and which form an essential part of this specification.

The invention is clearly illustrated in the accompanying drawings, in which:—

Figure 1 is a side elevation and Fig. 2 a transverse vertical section of a vending-apparatus which is provided with delivery-mechanism embodying the principles of the present invention. Fig. 3 is a top or plan view of the delivery-mechanism, shown detached from the casing and other parts of the vending apparatus; Figs. 4 and 5 are the two side-views of the mechanism shown in said Fig. 3; and Fig. 6 is a bottom view of the same. Fig. 7 is a top or plan view of the delivery mechanism, showing the relative positions of the parts and that of an actuating slide, when partly pushed in without the insertion of a coin in the coin-slot, or when a slug of less width than the width of a pre-determined coin has been inserted; and Fig. 8 is a side view of the parts represented in said Fig. 7. Fig. 9 is a cross-section of the mechanism, said section being taken on line 9—9 in said Fig. 7, when looking in the direction of the arrow $x$; and Fig. 10 is a similar section of the same parts, but showing in connection therewith a perforated slug or washer which has been inserted in the coin-slot. Fig. 11 is a top or plan view of the delivery-mechanism, showing the relative positions of the parts when a coin of the proper denomination has been inserted, showing the actuating slide pushed in to its full extent; and Fig. 12 is a cross-section, taken on line 12—12 in said Fig. 11, looking in the direction of the arrow $y$, and showing the coin retained against the side of a guide-plate and retaining device, until released by a coin-ejector; and Figs. 13 and 14 are the two side views of the parts shown in said Fig. 11. Fig. 15 is a top view of the delivery-mechanism, similar to Fig. 11, but showing the return-movement of the operating slide for actuating the coin-ejector; and Figs. 16 and 17 are a bottom and side-view, respectively, of the mechanism when the parts are in their relative positions indicated in said Fig. 15.

Similar characters of reference are employed in all of the above described views, to indicate corresponding parts.

Referring now to the several figures of the drawings, the reference-character 1 indicates the complete vending machine or apparatus, the same comprising a suitable hollow base 2, formed upon its upper portion with an ornamental body, as 3, which is provided with a delivery opening 4. The base may be provided with a perforated lug or lugs 5 for screwing the device upon a counter or other body, and in front of the opening 4 of said body 3, the base 2 is provided with a shelf 6 and a delivery-chute 7 extending therefrom, said chute projecting in an upward direction directly through said opening 4 into the interior of the hollow body 3, substantially in the manner clearly illustrated in Fig. 2 of the drawings. The said body 3 is preferably of a cylindrical configuration, and resting upon its marginal edge-portion 8, see Fig. 2, is a correspondingly formed plate or disk 9 of the delivery mechanism to be hereinafter more fully described. Resting directly upon the upper face of said plate or disk 9 is a shell 10, which is formed with a slightly upwardly extending marginal bead 11, from which extends in a downward direction, an annular marginal edge-portion 12, which is fitted about the upper outer surface of the body 3 to provide a closure, as will be clearly evident. The said shell 10 is made in said edge-portion 12 with a slide-receiving opening 13, and in its body it is formed with a coin-slot 14 and a goods-delivery opening 15. Resting upon said shell 10, so as to be surrounded by said bead 11, at its lower end, is a suitable hollow body 16, usually of a cylindrical configuration and preferably made of glass, the upper edge-portion of said body 16 being surrounded by the marginal bead 18 of a suitable ornamental cover 17, the several parts being suitably secured in their assembled positions by means of the usual tie-bolts or rods 19 in any suitable and well-known manner. The said top or cover 17 is provided with a coin-receiving slot 20, from which extends within the interior of the said body 16, a suitably formed coin-chute 21, which is bent preferably in the manner shown in said Fig. 2, and communicates at its lower end with the coin-slot 14 of the shell 10. In this manner, a suitable receptacle or chamber 22 is provided for the breath pellets, candies, peanuts, or other goods or articles which are offered for sale. Any suitable means for placing the goods within the chamber 22 may be used, as will be clearly evident. As shown in said Fig. 2 of the drawings, the hollow base 2 may also be formed with suitably disposed lugs, as 23, provided with screw-holes, and resting upon said lugs is a closing plate 24 which may be secured in place by means of screws 25, or any other suitable manner.

Having thus described the general arrangement of the various parts comprising the apparatus, we will now describe more in detail, the general arrangements and combinations of the devices and parts which constitute the coin-operated and coin-controlled delivery-mechanism embodying the principal features of our present invention.

The plate 9, herein-before mentioned, is formed within its upper surface with a diametrically extending depression, as 26, in which is fitted and is adapted to slide an operating slide-plate or element 27, the same being provided with a forwardly projecting member 28 which projects through the opening 13 in the edge-portion 12, as shown, and has upon its free end-portion a suitably shaped finger-piece or operating member 29. The said element or slide-plate 29 is preferably cut away, as at 30, so as to provide a finger 31, and it is also formed with a coin-slot 32, and an opening 33, formed with a knife-edge or chamfered part 34, which provides a cut-off, substantially as shown and for the purposes to be presently more fully described. The said element or slide-plate 27 is also provided with a downwardly projecting tongue or lug 37, usually formed by being forced out of the said slide-plate, near its edge 35, substantially as shown in the accompanying drawings. In its longitudinal marginal edge 35, opposite the edge which is provided with the cut-away part 30, the element or slide-plate 27 is provided with a cut-away part 36, one edge of which, forms a lug or stop, as will later appear, and the other edge 38 of which extends at an acute angle from the base of said stop, substantially in the manner illustrated. The said plate 9 is formed with an opening 39, which is located directly beneath the opening 15 in the shell 10, see Fig. 2, said opening being bounded by the downwardly extending flanges or shoulders 40 and 41, a pair of pivot-lugs or ears 42 being arranged back of and in close proximity to one of said shoulders, as 41. A pivotal pin 43 has its end-portions operatively connected with said pivot-lugs or ears 42, and secured to said end-portions of the pin 43 are other pivot-lugs or ears 46 which are connected with the side-members 45 of a closing plate 44. Thus, it will be seen, that the said plate 44 with its side-members 45, and said flanges or shoulders 40 and 41, when the plate 44 is in its normally closed position directly beneath the opening 33 in the slide-member or element 27, provides a suitable pocket or cup-like receptacle in which a predetermined quantity of the goods or articles which are to be dispensed, will become assembled, as clearly indicated in Fig. 2 of the drawings, until the said plate 44 is tilted in the manner to be hereinafter more fully described, at which time the said quantity of goods or articles will be delivered upon the chute 7 and the shelf 6 in front and outside of the apparatus. That such small articles, as breath-pellets or the like, will be retained upon the shelf when delivered upon the same, we have provided a saddle-shaped frame 47, see Figs. 1 and 2 of the drawings, said frame being provided with perforated end-portions 48 so as to be pivotally secured by means of pins 49 to suitably disposed lugs or ears 50 upon said base 2, and said frame 47 being provided with a lift or finger-piece 51 for raising it, and allowing the delivered articles to be scooped off into the palm of the hand of the purchaser, as will be clearly understood. That the said hinged or pivoted plate 44 will be retained in its normally closing relation beneath the openings 33 and 39, one of the said perforated ears or lugs 46, or other suitable part of said plate 44, has rearwardly extending therefrom a retaining lever or arm 52, formed with the upwardly extending edge-portion 53. As shown more particularly in Figs. 4 and 5 of the drawings, when the parts are in their normal initial positions, then the previously mentioned lug 37 bears directly upon the edge of said lever or arm 52, whereby the plate 44 is kept closed, until the said lug 37 is moved away from the said lever or arm, and thereby allows the said plate 44 to drop into its tilted and delivering position, indicated in Figs. 13 and 14 of the drawings.

Referring now again to Fig. 6 of the drawings, it will be seen that the plate or disk 9 is also formed with an opening, as 54, of a peculiar marginal configuration, said opening being made with the cut-in openings 55 and 56, respectively. Contiguous to one of the edges of said cut-in opening 55 is a downwardly extending post 57 to the lower end of which is pivoted upon a pin 58, a short retaining pawl 59. This pawl is provided at one end with a short stud-like finger or lug 60 which extends, normally into and through the said opening 55 in the plate 9. This finger or lug 60 is chamfered, as at 61, and is movably arranged in said opening 55, its chamfered edge 61 being caused, under certain conditions, to bear against the marginal edge of the slide-plate or element 27, by the action of a spring 62 which is suitably secured upon the bottom of the plate 9 by means of a pin or screw 63, and has its opposite end bearing against the said finger or lug 60, substantially as illustrated in the several figures of the drawings. As will be seen from Figs. 9 and 10, the said retaining pawl 59 is provided with a second stud or finger 64 extending toward the side of a guide-plate 65 which extends in a downward direction from said plate 9, contiguous to the one edge of the opening 57, said plate 65 being provided along one edge with a rib or projection 66, and a recess or cut-away portion 67 thereb eneath. In its opposite edge the said guide-plate is provided with another recess or cut-away portion 68, all of which is clearly shown in Figs. 5 and 14 of the drawings. Suitably connected with the under face of said disk or plate 9, and extending downwardly therefrom are a pair of posts or supports 69 and 70, the post 69 being tubular and having rotatably arranged therein a stem or short spindle 71, to the lower end of which, (which extends beneath said post 69,) is secured a trip-dog or element 72, from which extend a pair of lugs or projections 73 and 74, the latter lug or projection 74 extending into and being movable in the recess or cut-away portion 68, so as to be removed therefrom at the proper time. Upon the opposite and upper end-portion of the said stem or spindle 71 is a cam-disk 75 which is rotatably arranged upon the surface-portion of the depressed part 26 of the plate or disk 9, and in the cut-away part 30 of the slide-plate or element 27, as clearly shown in Figs. 3, 7, 11 and 15 of the drawings. The said cam-disk 75 is made with an angularly disposed edge-portion 76, and a short lug 77 for the purposes to be presently more fully described. Connected with and extending into the cut-away part 30 of the slide-plate or element 27 is a spring-bar or member 78 which is provided with a right-angled extension 79, all for the purposes to be presently more fully described. In a like manner, the support or post 70 is provided upon its lower end with a pivot or screw 80, upon which is pivotally arranged a trip-dog or element 81, from which extend a pair of lugs or projections 82 and 83, the lug 82 extending into and being movable in the recess or cutaway portion 67 of the guide-plate 65, so as to be capable of removal therefrom at the proper time. Extending laterally from the said guide-plate 65 is an arm 84 which is provided with a pivot or screw 85. Fulcrumed upon this pivot or screw 85 is an oscillating coin-ejecting element or member 86 which is provided at its upper end with a forwardly extending ejecting finger 87. This coin-ejector is also provided at its lower end with a lug or projection, as 88, having attached thereto the one end of a coiled spring 89. The opposite end of this spring is attached to the lug or projection 83 of the trip-dog 81, by means of a pin 90, or the like, and the purpose of this spring is to normally draw the respective lugs 74 and 83 of the respective trip-dogs 72 and 81 into the respective cut-away portions or recesses 68 and 67 of the guide-plate 65, so as to retain them therein, under normal conditions. The said spring 89 also causes the lug 82 of the trip-dog 81 to bear upon the lug 73 of the trip-dog 72, as clearly illustrated in Fig. 6 of the drawings.

Having thus described the general arrangement of the devices, and the construction of the parts comprising the coin-actuated and coin-controlled delivery mechanism, we will now briefly set forth the workings and operations of the said parts.

Suppose the chamber or compartment 22 of the device to have been filled with the goods which are to be dispensed. The slide-plate or member 27 being in the position indicated in Figs. 2 and 3, some of the goods will fill the pocket formed above the hinged or pivoted plate 44, as will be clearly evident. When the said plate or element 27 is pushed by means of its finger-piece, without having deposited a coin into the coin-chute, it can be moved in the direction of the arrow z in Fig. 3, until the recess or cut-away part 36 is brought opposite the chamfered finger or stud 60 of the pivoted pawl 59. Immediately the spring 62 forces said finger or stud into the recess or cut-away part 36 of the slide-plate or element 27, thereby causing the finger or stud to engage the stop-edge thereof, and any further movement of the said slide-plate or element 27 is arrested, as clearly illustrated in Fig. 7 of the drawings. At the same time the right-angled member 79 of the spring-bar 78 has passed over the projection 77 of the coin-disk 75, without operating the trip-dog 72, and the retaining lug or projection 37 having moved only into the position indicated in Fig. 8 of the drawings, still in retaining engagement with the arm or lever 52 of the plate or gate 44, so that the latter can not drop into its tilted position and hence no goods will be delivered. A pull upon the finger-piece of the plate or element 27, in the direction of the arrow $u$ in Fig. 15, permits the angular edge 38 to ride upon and over the chamfered edge 61 of the stud or finger 60, the member 79 of the spring-bar 78 being pulled against the projection 77 of the cam-disk 75 produces a slight rotary movement of the latter, and the slide-plate or element 27 is returned to its normal initial position, without the said gate or plate 44 having been operated.

Now, when a coin of the proper denomination and proper size and thickness is deposited into the coin-chute, it passes down the latter, through the slot 14 in the shell 10, and the slot 32 in the slide-plate or element 27, the coin passing directly through said slots and down along the side of the retaining plate 65, where it is retained by the two lugs 74 and 82 of the two trip-dogs, substantially as shown in Fig. 14, with the lug or finger 64 of the retaining pawl 59 bearing upon the one face of the coin, as clearly indicated in Fig. 12 of the drawings. Thus, when the slide-plate or element 27 is pushed in the direction of the arrow $z$ in Fig. 3, the slide or element can be pushed back the entire distance, from the position shown in said Fig. 3 to the position indicated in Fig. 11 of the drawings, the engagement of said finger 64 with the face of the coin being such, that the pivoted pawl 59 can not be moved by the spring 62, so that the stud or finger 60 is immovably held in the recess or cut-away part 59 and thus will not interfere with the movement of the slide-plate or element 27 for its entire distance. At the same time, as will be seen from an inspection of Figs. 13 and 14, the lug or projection 37 of the said slide-plate having passed beyond the free end of the arm or lever 52 of the hinged or pivoted gate or plate 44, the latter by its own weight drops into a tilted position, so as to deliver the goods upon the delivery-chute 7 of the apparatus. At the same time, the right-angled member 79 of the spring-arm or bar 78 has passed upon the other side of the cam-disk 75, as shown in said Fig. 11, and while the gate or plate 44 has been tilted, the coin is still held against the side of the plate 65, as shown in said Fig. 14. When, however, the slide-plate or element 27 is returned in the reverse direction, to its normal initial position, then the member 79 engages the lug or projection 77 of the cam-disk, as shown in Fig. 15, thereby producing a slight rotary motion of said disk and the stem or spindle, 69, whereby the trip-dog 72 is moved into the position shown in Fig. 16, the lug 73 of said dog 72 engaging the lug 82 of the trip-dog 81 whereby the two dogs assume the positions shown. At the same time, the two retaining lugs 74 and 83 are withdrawn from the recesses or cut-away portions 68 and 67 of the guide-plate 65, and the lug 74 of the trip-dog 72 moving against the edge of the ejecting element or member 86 moves the ejecting finger 87 thereof directly upon the edge of the coin, as shown in Fig. 17, and the coin is immediately ejected from the side of the guide-plate 65 and is deposited within the hollow base of the apparatus. The distended spring 89 thereupon returns these parts into their normal initial positions for operation when the next coin is dropped into the coin-chute. During the return movement of the slide-plate or element 27 the angularly inclined edge-portion of the lug or projection 37 rides upon the inclined end of the arm or lever 52, as will be clearly understood from an inspection of Figs. 8, 13 and 14, so that said projection is again brought into its retaining engagement with said arm or lever 52, thereby bringing the gate or plate 44 into its closed position, shown more particularly in Figs. 4, 5 and 8.

From an inspection of Fig. 2 it will be evident, that when the slide-plate 27 is pushed in its inward direction, the receiving pocket, formed above the gate or plate 44, becomes fully closed at the time that said gate or plate 44 is tilted, so that only the contents of said pocket will be delivered; but, that as soon as the slide-plate 27 has returned to its normal initial position and the gate or plate 44 is closed, the pocket above the same is refilled with a fresh supply of a pre-determined quantity of the goods from the chamber 22. That the said slide-plate or element 27, after it has been pushed in, may automatically return to its normal initial position, the lug or projection 37 may have extending therefrom a pin or post 91, to which is attached one end of a spring 93, the other end of said spring being secured to a lug or pin 92 upon the plate or disk 9, as clearly shown in Figs. 6 and 16 of the drawings, and the operation of which is well understood.

When a perforated slug, see Figs. 9 and 10, or a slug or other coin which is thinner than the coin of the proper denomination, is inserted after the slug or thin coin is retained against the side of the guide-plate 65, there will be sufficient pivotal movement of the member or element 59, to permit the retaining lug 60 to enter the recess or cut-away part 36 of the slide-plate or element 27, during its rearward movement, and thus arrest the said plate or element 27 in the position shown in Fig. 7, without having released the projection 37 from the arm 52 of the gate or plate 44, so that the said gate can not open, and there will be no delivery of the goods. Upon the return movement, the held slug or thin coin will be released from the side of the plate 65 in the manner of the coin of the proper denomination and size, and as has been previously described.

As has been previously stated, any suitable device or means may be employed for filling the chamber 22, one method of replacing pellets, or the like, in said chamber, being by removing the plate 24 and passing the pellets through a hole 94 in the disk or plate 9, the shell 10 being provided with a corresponding hole, not shown in the drawings, and the hole 94 being closed by means of the usual cork stopper, or other similar device, as will be clearly evident.

We are fully aware, that changes may be made in the arrangements and combinations of the various devices and parts, as well as in the details of the construction of the same, without departing from the scope of our present invention, as defined in the appended claims. Hence, we do not limit our invention to the exact arrangement and combinations of the devices and the parts thereof, as described in the foregoing specification and as illustrated in the accompanying drawings, nor do we confine ourselves to the exact details of the construction of any of the said parts.

We claim:—

1. In a vending machine, the combination with a plate provided with a depression, of a slide movably arranged in said depression, said plate being provided with an opening, and said slide being provided in one of its edges with a recess, of a post on said plate, and a holding element pivoted upon said post, said element having a portion movably arranged in the opening of said plate and adapted to be brought in holding engagement with the recess in the edge of said slide, substantially as and for the purposes set forth.

2. In a vending machine, the combination with a plate provided with a depression, of a slide movably arranged in said depression, said plate being provided with an opening, and said slide being provided in one of its edges with a recess, of a post on said plate, and a holding element pivoted upon said post, an upwardly extending lug on said element movably arranged in the opening of said plate and adapted to be brought in holding engagement with the recess in the edge of said slide, and a finger extending from another portion of said element, substantially as and for the purposes set forth.

3. In a vending machine, the combination with a plate provided with a depression, of a slide movably arranged in said depression, said plate being provided with an opening, and said slide being provided in one of its edges with a recess, of a post on said plate, and a holding element pivoted upon said post, said element having a portion movably arranged in the opening of said plate and adapted to be brought in holding engagement with the recess in the edge of said slide, and a spring secured at one end to said plate, said spring having its opposite end-portion in engagement with said pivoted element, substantially as and for the purposes set forth.

4. In a vending machine, the combination with a plate provided with a depression, of a slide movably arranged in said depression, said plate being provided with an opening, and said slide being provided in one of its edges with a recess, of a post on said plate, and a holding element pivoted upon said post, an upwardly extending lug on said element movably arranged in the opening of said plate and adapted to be brought in holding engagement with the recess in the edge of said slide, and a finger extending from another portion of said element, and a spring secured at one end to said plate, said spring having its opposite end-portion in engagement with said pivoted element, substantially as and for the purposes set forth.

5. In a vending machine, the combination with a main plate provided with an opening, and a slide movably arranged upon said plate, of a guide-plate extending from said main plate, a coin-retaining means movably connected with said guide-plate, and means for actuating said coin-retaining means to release the coin, substantially as and for the purposes set forth.

6. In a vending machine, the combination with a main plate provided with an opening, and a slide movably arranged upon said plate, of a guide-plate extending from said main plate, a coin-retaining means movably connected with said guide-plate, and means for actuating said coin-retaining means to release the coin, consisting of a spindle rotatably connected with said main plate, a cam-disk mounted upon said spindle, and means on said slide for actuating said cam-disk, substantially as and for the purposes set forth.

7. In a vending machine, the combination with a main plate provided with an opening, and a slide movably arranged upon said plate, of a guide-plate extending from said main plate, a coin-retaining means movably connected with said guide-plate, and means for actuating said coin-retaining means to release the coin, consisting of a spindle rotatably connected with said main plate, a cam-disk mounted upon said spindle, a projection or lug extending from said cam-disk, a spring-bar extending from said slide, and an extension on said spring-bar adapted to be brought in engagement with said projection or lug for actuating said cam-disk, substantially as and for the purposes set forth.

8. In a vending machine, the combination with a main plate provided with an opening, and a slide movably arranged upon said plate, of a guide-plate extending from said main plate, said guide-plate being provided with recesses in its opposite edges, a pair of oscillatory trip-dogs, and a lug on each trip-dog extending into and movably arranged in the recesses in said edges of the guide-plate, and means for actuating said trip-dogs to release the coin, substantially as and for the purposes set forth.

9. In a vending machine, the combination with a main plate provided with an opening, and a slide movably arranged upon said plate, of a guide-plate extending from said main plate, said guide-plate being provided with recesses in its opposite edges, a pair of oscillatory trip-dogs, and a lug on each trip-dog extending into and movably arranged in the recesses in said edges of the guide-plate, and means for actuating said trip-dogs to release the coin, consisting of a rotatable spindle connected with one of said trip-dogs, a cam-disk mounted upon said spindle, and means on said slide for actuating said cam-disk, substantially as and for the purposes set forth.

10. In a vending machine, the combination with a main plate provided with an opening, and a slide movably arranged upon said plate, of a guide-plate extending from said main plate, said guide-plate being provided with recesses in its opposite edges, a pair of oscillatory trip-dogs, and a lug on each trip-dog extending into and movably arranged in the recesses in said edges of the guide-plate, and means for actuating said trip-dogs to release the coin, consisting of a rotatable spindle connected with one of said trip-dogs, a cam-disk mounted upon said spindle, a projection or lug extending from said cam-disk, a spring-bar extending from said slide, and an extension on said spring-bar adapted to be brought in engagement with said projection or lug for actuating said cam-disk, substantially as and for the purposes set forth.

11. In a vending machine, the combination with a main plate provided with an opening, and a slide movably arranged upon said plate, of a guide-plate extending from said main plate, said guide-plate being provided with recesses in its opposite edges, a pair of oscillatory trip-dogs, lugs 74 and 83 on the respective trip-dogs extending into and movably arranged in the recesses in said edges of the guide-plate, and lugs 73 and 83 on the respective trip-dogs, said lugs 73 and 83 resting in engagement with each other, and means for actuating said trip-dogs to release the coin, substantially as and for the purposes set forth.

12. In a vending machine, the combination with a main plate provided with an opening, and a slide movably arranged upon said plate, of a guide-plate extending from said main plate, said guide-plate being provided with recesses in its opposite edges, a pair of oscillatory trip-dogs, lugs 74 and 83 on the respective trip-dogs extending into and movably arranged in the recesses in said edges of the guide-plate, and lugs 73 and 83 on the respective trip-dogs, said lugs 73 and 83 resting in engagement with each other, and means for actuating said trip-dogs to release the coin, consisting of a rotatable spindle connected with one of said trip-dogs, a cam-disk mounted upon said spindle, and means on said slide for actuating said cam-disk, substantially as and for the purposes set forth.

13. In a vending machine, the combination with a main plate provided with an opening, and a slide movably arranged upon said plate, of a guide-plate extending from said main plate, said guide-plate being provided with recesses in its opposite edges, a pair of oscillatory trip-dogs, lugs 74 and 83 on the respective trip-dogs extending into and movably arranged in the recesses in said edges of the guide-plate, and lugs 73 and 83 on the respective trip-dogs, said lugs 73 and 83 resting in engagement with each other, and means for actuating said trip-dogs to release the coin, consisting of a rotatable spindle connected with one of said trip-dogs, a cam-disk mounted upon said spindle, a projection or lug extending from said cam-disk, a spring-bar extending from said slide, and an extension on said spring-bar adapted to be brought in engagement with said projection or lug for actuating said cam-disk, substantially as and for the purposes set forth.

14. In a vending machine, the combination with a main plate provided with an opening, and a slide movably arranged upon said plate, of a guide-plate extending from said main plate, a coin-retaining means movably connected with said guide-plate, and means for actuating said coin-retaining means to release the coin, and a coin-ejector pivotally connected with said guide-plate, said ejector being actuated by the movement of said coin-retaining means, substantially as and for the purposes set forth.

15. In a vending machine, the combination with a main plate provided with an opening, and a slide movably arranged upon said plate, of a guide-plate extending from said main plate, a coin-retaining means movably connected with said guide-plate, and means for actuating said coin-retaining means to release the coin, consisting of a spindle rotatably connected with said main plate, a cam-disk mounted upon said spindle, and means on said slide for actuating said cam-disk, and a coin-ejector pivotally connected with said guide-plate, said ejector being actuated by the movement of said coin-retaining means, substantially as and for the purposes set forth.

16. In a vending machine, the combination with a main plate provided with an opening, and a slide movably arranged upon said plate, of a guide-plate extending from said main plate, a coin-retaining means movably connected with said guide-plate, and means for actuating said coin-retaining means to release the coin, consisting of a spindle rotatably connected with said main plate, a cam-disk mounted upon said spindle, a projection or lug extending from said cam-disk, a spring-bar extending from said slide, and an extension on said spring-bar adapted to be brought in engagement with said projection or lug for actuating said cam-disk, and a coin-ejector pivotally connected with said guide-plate, said ejector being actuated by the movement of said coin-retaining means, substantially as and for the purposes set forth.

17. In a vending machine, the combination with a main plate provided with an opening, and a slide movably arranged upon said plate, of a guide-plate extending from said main plate, said guide-plate being provided with recesses in its opposite edges, a pair of oscillatory trip-dogs, and a lug on each trip-dog extending into and movably arranged in the recesses in said edges of the guide-plate, and means for actuating said trip-dogs to release the coin, a coin-ejector pivotally connected with said guide-plate, said ejector being actuated by one of said trip-dogs, and a spring between said ejector and the other trip-dog, substantially as and for the purposes set forth.

18. In a vending machine, the combination with a main plate provided with an opening, and a slide movably arranged upon said plate, of a guide-plate extending from said main plate, said guide-plate being provided with recesses in its opposite edges, a pair of oscillatory trip-dogs, and a lug on each trip-dog extending into and movably arranged in the recesses in said edges of the guide-plate, and means for actuating said trip-dogs to release the coin, consisting of a rotatable spindle connected with one of said trip-dogs, a cam-disk mounted upon said spindle, and means on said slide for actuating said cam-disk, a coin-ejector pivotally connected with said guide-plate, said ejector being actuated by one of said trip-dogs, and a spring between said ejector and the other trip-dog, substantially as and for the purposes set forth.

19. In a vending machine, the combination with a main plate provided with an opening, and a slide movably arranged upon said plate, of a guide-plate extending from said main plate, said guide-plate being provided with recesses in its opposite edges, a pair of oscillatory trip-dogs, and a lug on each trip-dog extending into and movably arranged in the recesses in said edges of the guide-plate, and means for actuating said trip-dogs to release the coin, consisting of a rotatable spindle connected with one of said trip-dogs, a cam-disk mounted upon said spindle, a projection or lug extending from said cam-disk, a spring-bar extending from said slide, and an extension on said spring-bar adapted to be brought in engagement with said projection or lug for actuating said cam-disk, a coin-ejector pivotally connected with said guide-plate, said ejector being actuated by one of said trip-dogs, and a spring between said ejector and the other trip-dog, substantially as and for the purposes set forth.

20. In a vending machine, the combination with a main plate provided with an opening, and a slide movably arranged upon said plate, of a guide-plate extending from said main plate, said guide-plate being provided with recesses in its opposite edges, a pair of oscillatory trip-dogs, lugs 74 and 83 on the respective trip-dogs extending into and movably arranged in the recesses in said edges of the guide-plate, and lugs 73 and 83 on the respective trip-dogs, said lugs 73 and 83 resting in engagement with each other, and means for actuating said trip-dogs to release the coin, a coin-ejector pivotally connected with said guide-plate, said ejector being actuated by one of said trip-dogs, and a spring between said ejector and the other trip-dog, substantially as and for the purposes set forth.

21. In a vending machine, the combination with a main plate provided with an opening, and a slide movably arranged upon said plate, of a guide-plate extending from said main plate, said guide-plate being provided with recesses in its opposite edges, a pair of oscillatory trip-dogs, lugs 74 and 83 on the respective trip-dogs extending into and movably arranged in the recesses in said edges of the guide-plate, and lugs 73 and 83 on the respective trip-dogs, said lugs 73 and 83 resting in engagement with each other, and means for actuating said trip-dogs, to release the coin, consisting of a rotatable spindle connected with one of said trip-dogs, a cam-disk mounted upon said spindle, and means on said slide for actuating said cam-disk, a coin-ejector pivotally connected with said guide-plate, said ejector being actuated by one of said trip-dogs, and a spring between said ejector and the other trip-dog, substantially as and for the purposes set forth.

22. In a vending machine, the combination with a main plate provided with an opening, and a slide movably arranged upon said plate, of a guide-plate extending from said main plate, said guide-plate being provided with recesses in its opposite edges, a pair of oscillatory trip-dogs, lugs 74 and 83 on the respective trip-dogs extending into and movably arranged in the recesses in said edges of the guide-plate, and lugs 73 and 83 on the respective trip-dogs, said lugs 73 and 83 resting in engagement with each other, and means for actuating said trip-dogs to release the coin, consisting of a rotatable spindle connected with one of said trip-dogs, a cam-disk mounted upon said spindle, a projection or lug extending from said cam-disk, a spring-bar extending from said slide, and an extension on said spring-bar adapted to be brought in engagement with said projection or lug for actuating said cam-disk, a coin-ejector pivotally connected with said guide-plate, said ejector being actuated by one of said trip-dogs, and a spring between said ejector and the other trip-dog, substantially as and for the purposes set forth.

23. In a vending machine, the combination with a main plate provided with an opening, and a slide movably arranged upon said plate, of a guide-plate extending from said main plate, a post extending downwardly from said main plate, an element pivoted upon said post, and a finger on said element, said finger extending toward said guide-plate, substantially as and for the purposes set forth.

24. In a vending machine, the combination with a main plate provided with an opening, and a slide movably arranged upon said plate, of a guide-plate extending from said main plate, a post extending downwardly from said main plate, an element pivoted upon said post, and a finger on said element, said finger extending toward said guide-plate, and a spring secured at one end to said plate, said spring having its opposite end portion in engagement with said pivoted element, substantially as and for the purposes set forth.

In testimony, that we claim the invention set forth above we have hereunto set our hands this 10th day of July, 1907.

FREDERICK E. BLODGETT.
CHARLES E. KAIL.

Witnesses:
   FREDK. C. FRAENTZEL,
   F. H. W. FRAENTZEL.